United States Patent [19]

Puckette

[11] Patent Number: 4,535,297
[45] Date of Patent: Aug. 13, 1985

[54] BINARY SIGNAL DEMODULATOR WITH COMPARATIVE VALUE DECISION CIRCUITRY

[75] Inventor: Charles M. Puckette, Scotia, N.Y.

[73] Assignee: General Electric Company, Schenectady, N.Y.

[21] Appl. No.: 569,429

[22] Filed: Jan. 9, 1984

[51] Int. Cl.³ .............................................. H03D 3/00
[52] U.S. Cl. .................................. 329/126; 329/110; 375/82; 375/88
[58] Field of Search .......................... 329/50, 110, 126; 375/45, 80, 82, 88

[56] References Cited

U.S. PATENT DOCUMENTS 4,475,219  10/1984  Puckette ............................... 375/82

Primary Examiner—Eugene R. Laroche
Assistant Examiner—Robert J. Pascal
Attorney, Agent, or Firm—Geoffrey H. Krauss; James C. Davis, Jr.; Marvin Snyder

[57] ABSTRACT

An improved digital data demodulator, capable of properly detecting Manchester-encoded FSK received signals or chirped-frequency-modulated received signals, utilizes a multiplexer for switching the clock signals, to a pair of counters, from one of the mixing means receiving the input and phase-quadrature local reference signals, at a time essentially at the middle of each bit time interval expected for the incoming data signal, and is insensitive to time base jitter or other sources of timing error. In all embodiments, the transmission frequency and data bit rate are determined by externally-supplied reference frequencies, to allow a single demodulator to be utilized with a multiplicity of digital data signals having differing characteristics.

18 Claims, 13 Drawing Figures

BINARY SIGNAL DEMODULATOR WITH COMPARATIVE VALUE DECISION CIRCUITRY

BACKGROUND OF THE INVENTION

The present invention relates to data signal demodulators and, more particularly, to a novel improved data demodulator utilizing a comparative decision circuit and having an easily-varied operating frequency and data bit rate range.

Digital data is commonly sent over a communications channel by shifting the frequency of a transmitted communications signal between discrete values representing the digital information. For binary digital data, the carrier frequency is typically shifted to a high frequency for transmitting a first binary value and to a lower frequency for transmitting the remaining binary value. A data receiver receives this frequency-shifted-keyed (FSK) carrier and decides whether the higher or lower frequency is then being received to provide a data output having the first or second binary value. While many such data demodulator circuits are known to the prior art, not all of these circuits are capable of being monolithically integrated into a single, low-cost integrated circuit component. It is highly desirable that any such integrated component have the ability to shift the operating frequency band by merely changing a reference frequency; one such demodulator is described and claimed in my co-pending application Ser. No. 409,237 filed Aug. 18, 1982, now U.S. Pat. No. 4,475,219 issued Oct. 2, 1984, assigned to the assignee of the present application and incorporated herein in its entirety by reference. Briefly, the absolute-value-decision FSK demodulator circuit of the aforementioned application utilizes means for providing first and second local reference signals, in phase-quadrature to one another, with each of the local reference signals being coupled to an associated one of a pair of signal mixing means, each receiving a hard-limited version of the received signal to be demodulated. The difference outputs of one mixing means are provided to a counter, which is reset at the start of each bit timing interval. The count in each of a pair of counters is clocked by one output of the other mixing means, such that the absolute portion of the time that the input signal is at one or the other of the FSK frequencies can be used to provide the binary data output condition at the end of the bit time interval. In such a digital data demodulator, the arithmetic mean of the FSK frequencies is supplied to the phase-quadrature local reference signal means and can be easily varied to vary the frequency of the FSK channel being received.

It is highly desirable that a comparative, rather than an absolute, value decision process be utilized in such a detector, to allow the detector to be utilized for receiving digital data which is transmitted as a more-reliable encoded signal, e.g. as either Manchester-encoded FSK signals or frequency-chirped (sweep up/sweep down) frequency-modulated signals.

BRIEF SUMMARY OF THE INVENTION

In accordance with the present invention, an improved digital data demodulator, capable of properly detecting Manchester-encoded FSK received signals or chirped-frequency-modulated received signals, utilizes a multiplexing means for switching the clock signals, to a pair of counter means, from one of the mixing means receiving the input and phase-quadrature local reference signals, at a time essentially at the middle of each bit time interval expected for the incoming data signal, and is insensitive to time base jitter or other sources of timing error.

In a first presently preferred embodiment, for use with signals having binary data encoded thereon by chirped-frequency-modulation, the reversal of the clock signal to the pair of counter means allows a beat-note-count to be continuously accumulated and to indicate whether an up-frequency chirp, or a down-frequency chirp, digital data signal has been received. The circuit also includes means for declaring a received data bit valid if a preselected minimum of the expected total beat-note-cycles are received during a bit time interval.

In another presently preferred embodiment of the present invention, all stages of each of the pair of counters are compared to determine if Manchester-encoded FSK signals have been correctly received and demodulated. The Manchester-encoded FSK signal demodulation process is advantageously enhanced by use of an input filter for providing additional interference rejection.

In all embodiments, the transmission frequency and data bit rate are determined by externally-supplied reference frequencies, to allow a single demodulator to be utilized with a vast multiplicity of digital data signals having differing characteristics.

Accordingly, it is an object of the present invention to provide novel improved binary data signal demodulators.

This and other objects of the present invention will become apparent upon consideration of the following detailed description, when read in conjunction with the drawings.

DETAILED DESCRIPTION OF THE INVENTION

Figure 1:
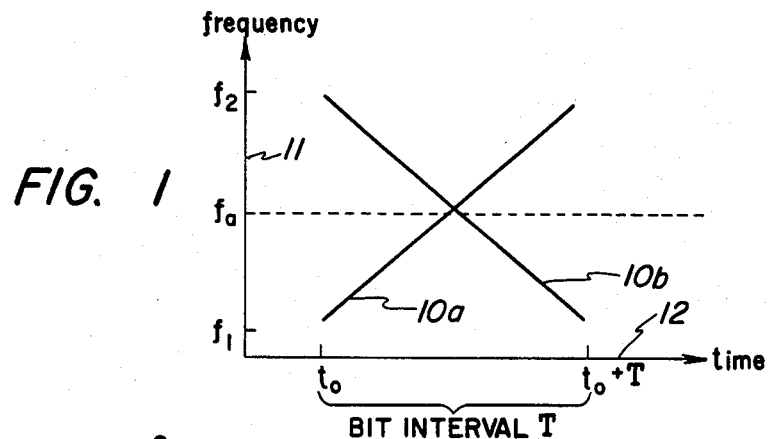
FIG. 1 is a frequency vs. time diagram of the instantaneous frequency waveforms utilized in transmitting binary digital data with one chirped-frequency-modulation method, and useful in understanding the principles of operation of a first embodiment of my improved digital data demodulator.

Referring initially to FIG. 1, one form of chirped-frequency-modulation for the transmission of binary digital data signals is graphically illustrated. In this up-/down-chirped-modulation form, a substantially-constant-amplitude sinusoidal signal is transmitted. A first logic state (e.g. a logic 1 state) is represented as a signal corresponding to line 10a, having a frequency (represented along ordinate 11) which begins at a first initial value, e.g. lowest frequency $f_1$, at the beginning of a bit time interval T (e.g. at initial time $t_0$, where time is represented along abscessa 12) and substantially linearly increases frequency for the remainder of the bit period (to time $t_0+T$) to a first final frequency value (e.g. highest frequency $f_2$). The second logic state (e.g. a logic 0 state) is provided by a down-chirped signal 10b having a second initial frequency (e.g. highest frequency $f_2$) at the beginning at time $t_0$ of the bit time interval and substantially linearly decreasing in frequency with time to a second final frequency (e.g. lowest frequency $f_1$) at the end of the bit time interval T (e.g. at time $t_0+T$). With up-chirp signal 10a and a down-chirp signal 10b having the same lowest frequency $f_1$ and highest frequency $f_2$, over identical bit time intervals T, an average frequency $f_a$ can be found at the crossing of the substantially linear frequency-time curves 10a and 10b (e.g. $f_a=(f_1+f_2)/2$).

It has been suggested to detect chirped signals of this type by use of a correlation receiver, which multiplies the incoming signal by replicas of the known transmitted waveforms, i.e. by both an up-chirp signal 10a and a down-chirp signal 10b, with the multiplication results being independently integrated over the bit time interval T and a decision made on the basis of the relative integrator output levels. This highly-complex approach must overcome the problem of insuring that the reference waveforms are correctly aligned with the received signals. Another suggested approach to detection of chirp-frequency waveforms is that utilizing a tapped delay line, or transversal filter, structure, typically implemented with SAW or CCD devices. Such demodulators are presently inordinately expensive. My improved binary data demodulator circuit, described hereinbelow, provides a reliable means for recovering digital information that is transmitted utilizing up/down-chirped-frequency-modulation, is amenable to monolithic integration techniques and allows bit time interval T and average frequency $F_a$ information to be varied to overcome the problem of properly aligning internal frequencies with received signal frequencies.

Figure 2A:
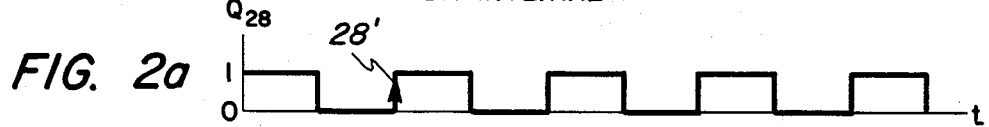
FIGS. 2a–2c are a group of time-correlated signal waveform graphs illustrating principles of operation of the digital data demodulator.
Figure 2B:
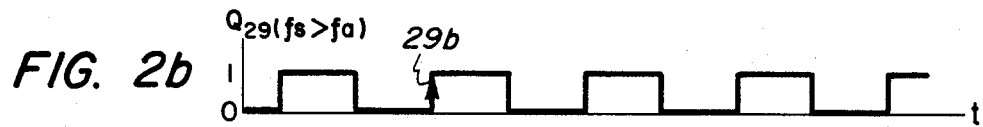
Figure 2C:
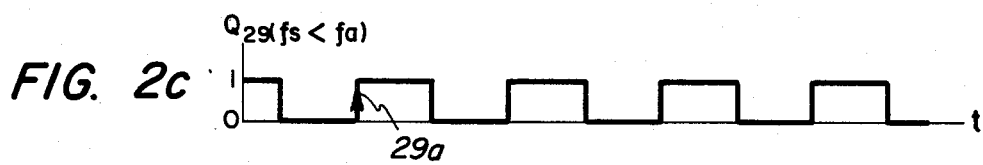
Figure 2:
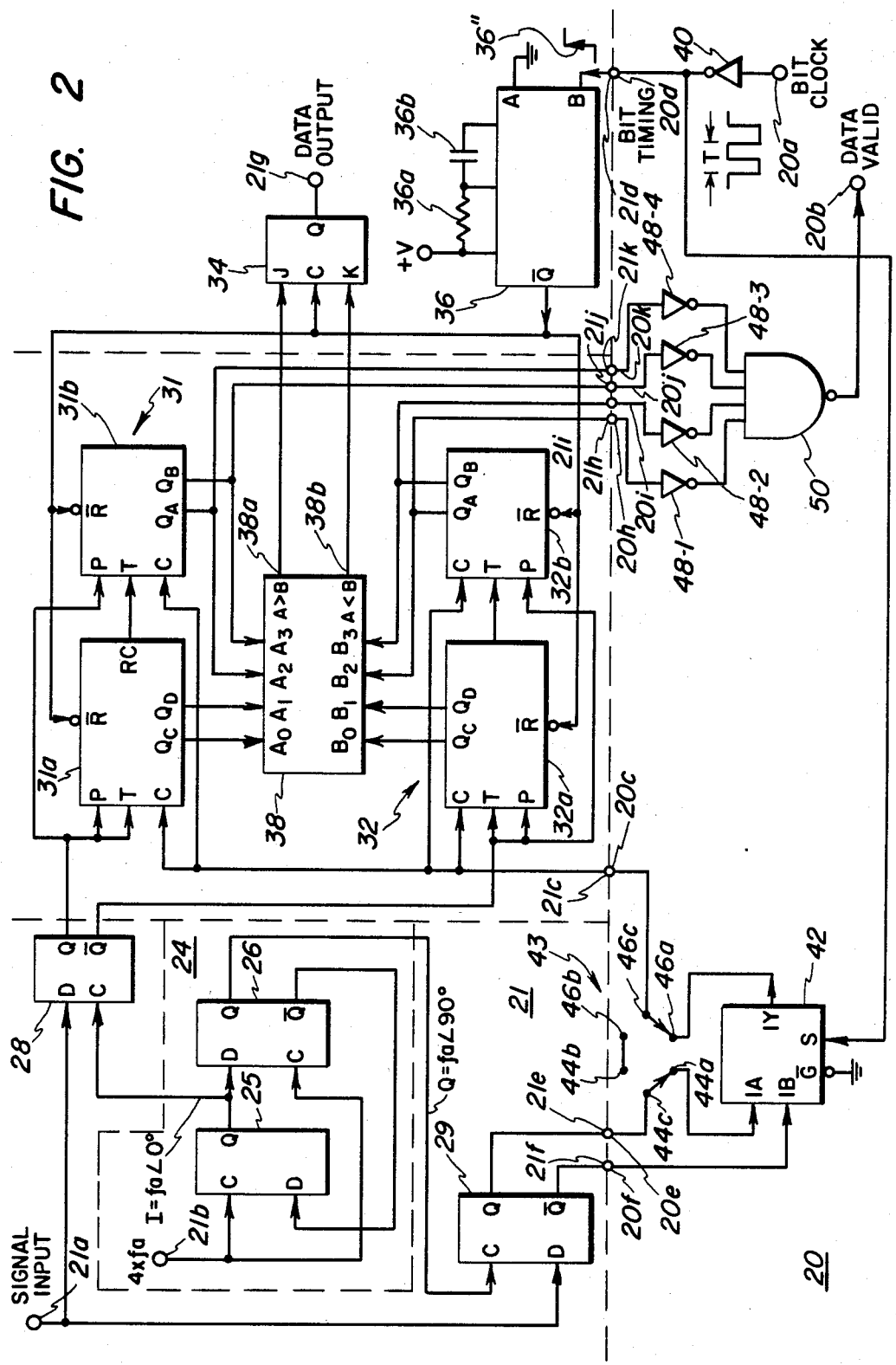
FIG. 2 is a schematic block diagram of a first presently preferred embodiment of my improved digital data demodulator.

One presently preferred embodiment of my improved binary data detector, for use with an up/down-chirped-frequency-modulation signal is illustrated in FIG. 2. An improvement subcircuit 20 is added to a basic binary data demodulator circuit 21, such as that previously disclosed and claimed in the aforementioned co-pending application. Demodulator signal input terminal 21a receives an amplitude-limited signal responsive to reception of the chirped-frequency-modulated signal from a transmitting location. By way of illustration only, without limitation, a power-line-carrier (PLC) data network may utilize a chirped-frequency signal having a lower frequency $f_1$ of about 100 KHz. and an upper frequency $f_2$ of about 200 KHz., such that the average frequency $f_a$ is about 150 KHz., with a bit time interval T of about 1 millisecond. Thus, signal input 21a will receive a substantially-constant-amplitude, swept-frequency signal, having an instantaneous frequency between about 100 KHz. and about 200 KHz. A local oscillator (LO) signal is provided to another circuit input 21b at a frequency which is a multiple N of the transmitted average frequency $f_a$; in particular, N=4 and the local oscillator frequency $f_{LO}=4\times f_a$, or about 600 KHz., for the illustrated average $f_a$ frequency of 150 KHz. A phase-quadrature circuit 24 utilizes first and second D-type flip-flops 25 and 26 for providing a pair of reference signals in phase-quadrature. The clock inputs C of both flip-flops 25 and 26 are connected in parallel to local oscillator input terminal 21b. The data D input of first flip-flop 25 is connected to the complementary $\overline{Q}$ output of second flip-flop 26, while the data D input of the second flip-flop is connected to the Q output of first flip-flop 25. The phase-quadrature signals, at the average $f_a$ frequency, appear at the Q outputs of first and second flip-flops 25 and 26. The zero-phase first reference signal I output, from the Q output of first flip-flow 25 (represented by the I signal having the frequency and phase relationship $f_a\angle 0°$) is applied to the clock input of a first mixing means 28, while the second reference, or Q, signal, having the same frequency as the first reference signal (and represented by the frequency/phase relationship $f_a\angle 90°$) is applied to the clock C input of a second mixing means 29. Each of mixing means 28 and 29 is one of third and fourth D-type flip-flops, each having the amplitude-limited input signal applied from terminal 21a to the data D input thereof. As more fully explained in the aforementioned co-pending application, the phase of the low-to-high transition of the Q output of second mixer means 29, relative to the low-to-high transition of the Q output of first mixing means 28, indicates whether the frequency of the signal received at input 21a is above or below the reference frequency, i.e. above or below average frequency $f_a$. This relationship is illustrated in FIGS. 2a–2c, wherein the squarewave at the Q output of mixing means 28 (FIG. 2a) has a low-to-high transition edge 28' occurring after the low-to-high transition edge 29a in the Q output of flip-flop 29 if the instantaneous received signal frequency $f_s$ is less than the average frequency $f_a$ (FIG. 2c) and occurring before the low-to-high transition 29b (FIG. 2b) if the instantaneous received signal frequency $f_s$ is greater than the average frequency $f_a$.

The Q output of first mixing means 28 is provided to both the P and T enable inputs of a first (4-bit) counter 31a and to the P enable input of a second (4-bit) counter 31b of a first (8-bit) counter means 31, while the complementary $\overline{Q}$ output of first mixing means 28 is provided in parallel to both the T and P enable inputs of a first (4-bit) counter 32a and to the P enable input of a second (4-bit) counter 32b of a second (8-bit) counter means 32. The clock C inputs of both 4-bit counters 31a and 31b or 32a and 32b of the respective first and second counter means 31 or 32 are all connected in parallel to a counter clock input terminal 21c. The reset $\overline{R}$ terminals of all four counter integrated circuits 31a, 31b, 32a and 32b of both counter means 31 and 32 are connected in parallel, as is the clock C input of a J-K flip-flop logic element 34, to the complementary $\overline{Q}$ output of monostable multivibrator means 36. Multivibrator 36 has the negative-edge-triggering input A thereof connected to circuit common potential and the positive-going-edge-triggering B input thereof connected to an input 21d; the monostable multivibrator 36 produces a low logic level pulse, of a duration determined by an associated timing resistor 36a and an associated timing capacitor 36b, for each positive-going transition 36' of the signal at input 21d. The Q and $\overline{Q}$ outputs of second mixing means 29 are respectively provided at outputs 21e and 21f. The Q output of flip-flop 34 is connected to the demodulator data output terminal 21g. The J input of flip-flop 34 is connected to a first output 38a of an N-bit comparator means 38 (where N is illustratively 4), while a second output 38b thereof is connected to the K input of flip-flop 34. Each of the first set of 4-bit inputs $A_0$-$A_3$ of comparator means 38 are individually connected to one of four selected stage outputs of the first counter means 31. Illustratively, these are the third stage $Q_c$ output and fourth stage $Q_d$ output of the first counter 31a and the first stage $Q_a$ output and second stage $Q_b$ output of second counter 31b. Each of the second set of 4-bit inputs $B_0$-$B_3$ of comparator means 38 are individually connected to the same associated one of the outputs of second counter means 32; illustratively, the $Q_c$ and $Q_d$ outputs of counter 32a and the $Q_a$ and $Q_b$ outputs of counter 32b. The exact configuration of connections of counter outputs and comparator inputs is determined as described hereinbelow. However, the two highest counter bit outputs connected from each of the two counter means 31 and 32 to comparator means 38 are also connected to the associated individual outputs 21h–21k for use in providing a valid data signal, as hereinbelow explained.

Improvement subcircuit 20 includes an inverting means 40 having an input connected to a first subcircuit input 20a at which a squarewave signal at the desired bit clock frequency (corresponding to the bit time interval T) is provided, and having an output connected to bit timing output 20d, itself connected to the main circuit bit timing input 21d. The inverter 40 output is also connected to the select S input of a multiplexing means 42. Multiplexing means 42 has its enable $\overline{G}$ input connected to ground potential for permanent enablement of the multiplexing means and has a first selectable input 1A connected to a first selectable terminal 44a of the first section of a switching means 43. The second selectable input 1B of multiplexing means 42 is connected to an input 20f, for receiving the $\overline{Q}$ output signal from second mixing means 29, at corresponding mating terminal 21f. The multiplexing means common output 1Y is connected to a first selectable terminal 46a of the second section of the double-pole/double-throw mode selection switch means 43. The second selectable terminals 44b and 46b of the first and second sections of mode selection switching means 43 are connected to one another, while the first section common terminal 44c is connected to subcircuit 20 input terminal 20e to receive the Q output signal of second mixing means 29 at the associated output terminal 21e thereof. The switching means 43 second-section common terminal 46c is connected to an output terminal 20c for providing the common counter clock signal to associated clock input terminal 21c.

Circuit portion 20 also includes a plurality of inverters 48, equal in number (e.g. 4) to the number of counter means output stages connected to first section 21 output terminals (e.g. terminals 21h–21k). Illustratively, the four inverters 48-1 through 48-4 each have an input individually connected to one improvement section input 20h–20k, themselves connected to the associated counter stage output terminals 21h through 21k. Each of the outputs of inverters 48 is connected to a separate individual input of a multiple-input NAND gate 50. Illustratively, gate 50 is a four-input NAND gate. The output of gate 50 is connected to the data valid output 20b of the improvement subsection, for providing a signal at a first logic level (e.g. a logic 1 level) whenever valid data is available at the DATA output 21g of the main demodulator section.

It will be seen that the multiple-bit (8-bit) counters 31 and 32 each store therein a count value which is increased by one whenever a low-to-high clock transition occurs at a time when the counter is enabled by a high logic level signal at the P enable and T enable inputs thereof. For the 8-bit arrangement illustrated, where the ripple carry RC output of the first counter section 31a or 32a is connected to the T-enable input of the second counter section 31b or 32b, respectively, the count in first counter means 31 will increase by one whenever the Q output of first mixing means 28 is at a high logic level and a positive-going clock transition occurs at clock input 21c. Conversely, if the positive-going clock transition occurs when the first mixing means Q output is at a high logic level, the count in second counter means 32 will increase by one.

Referring to FIGS. 3a–3d, for a transmitted logic 1 data bit, the received signal frequency $f_s$ (FIG. 3a) is increasing linearly with time from initial frequency $f_1$ to final frequency $f_2$, over bit time interval T. It will be seen (FIG. 3b) that the high logic level pulses 52 at the Q output of first mixing means 28 increase their duration as the received signal frequency comes closer to the average frequency of the chirp waveform, and decrease their duration as the received instantaneous signal frequency moves further away from the chirp waveform average frequency $F_a$. It will also be seen that, because the average frequency is midway between the start and end frequencies $f_1$ and $f_2$, respectively, the durational change of the first mixing means Q output pulses 52 reverses during the bit time interval T; that is; the shorter-duration pulses at the beginning of bit time interval T increase to maximum duration at the time equal to one-half the bit time interval, as the logic 1 frequency chirp increases its frequency toward the average frequency, and then decrease their duration in the latter half of the bit time interval, as the chirp frequency increases its separation from the average frequency. Therefore, if, for example, an up-chirp signal is being received and the second mixing means Q signal is utilized as a clock (as would occur if selection switch 43 is configured to connect first-section common terminal 44c to first-section second selectable terminal 44b and second-section second selectable terminal 46b to second-section common terminal 46c) the first counter means 31 would count the number of beat note 52 cycles generated by mixing the average and signal frequencies, for the first-half bit time interval (from time $t_0$ to time $t_0+T/2$) and second counter means would count an identical number of beat-note-cycles for the second half of the bit time interval (from time $t_0+T/2$ to time $t_{0=T}$). The digital comparator means 38 would then substantially indicate an identical count in each of counter means 31 and 32 and neither output 38a nor 38b would be enabled. Accordingly, a non-valid data output state would be provided at the data output terminal 21g, as the Q output of flip-flop 34 would remain at the level of the last validly-received data bit.

Figure 3A:
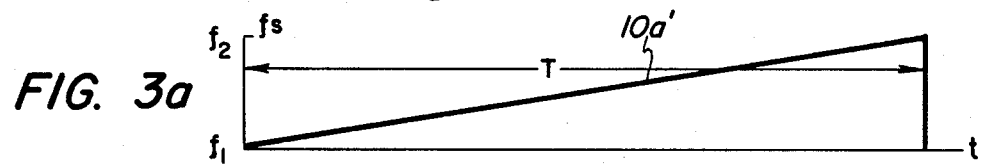
FIGS. 3a–3d are another group of time-coordinated signal waveform graphs illustrating the operation of the chirped-frequency-modulation signal demodulator circuit of FIG. 2.
Figure 3B:
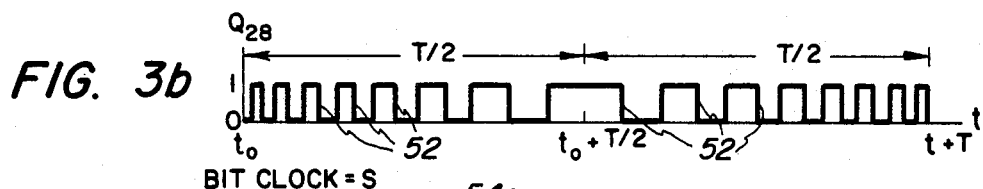
Figure 3C:
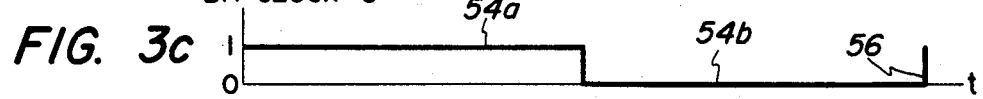
Figure 3D:

In accordance with one aspect of the present invention, the beat-note-count is continuously accumulated in that one of the pair of counter means associated with the binary data value being received (counter means 31 for a logic 1 binary data value and counter means 32 for a binary 0 data value), by reversing the logic state of the clock signals utilized during the second half of the bit time interval T from the logic state of the clock pulses produced by second mixing means 29 in the first half of the bit time interval. This is equivalent to permanent connection of switching means 43 in the indicated condition; it should be understood that double-pole/double-throw switching means 43 is illustrated only for purposes of discussion and that the improved data detector of the present invention will typically have the second mixing means Q signal at demodulator output 21e and improvement section input 20e permanently connected to multiplexer first selectable input 1A and will have the multiplexer common output 1Y permanently connected to the improvement section clock output terminal 20c. The selection of the proper one of second mixing means Q output and $\overline{Q}$ output signals as the clock signal for the appropriate half of the bit time interval is accomplished by utilizing the complemented bit clock squarewave, at the output of buffering inverter 40, as the multiplex means 42 select S input signal. Thus, during the first half of the bit time interval, itself set by selection of the bit clock frequency and therefore fully externally adjustable, the high logic level at bit clock input 20a is inverted to a low logic level portion 54a at multiplex means select S input. The first selectable terminal 1A is connected to multiplexer common output terminal 1Y, responsive to low logic level portion 54a, such that the second mixing means Q output signal is utilized as a clock signal during the first half of bit time interval T. During the second half of the bit time interval, the logic 0 level at input 20a is inverted to provide a logic 1 level 54b at multiplexing means select S input, connecting the second mixing means complementary $\overline{Q}$ output signal through the multiplexing means to the clock signal input 21c. Thus, to counter means 31 and 32 the reversal of the logic state of the clock pulses during the second half of the bit time interval causes the up-chirp signal to appear as if it increases frequency from lowest frequency $f_1$ to the average frequency $f_a$ in the first half of the bit time interval and then appears to decrease back to the initial frequency $f_1$ in the second half of the bit time interval. Similarly, a down-chirp (logic 0) signal appears to decrease in frequency from its initial high frequency $f_2$ to the average frequency $f_a$, during the first half of the bit time interval and then increase in frequency to an apparent final high frequency $f_2$ during the second half of the bit time interval. Thus, each of the pair of counter means 31 and 32 counts the first mixing means output pulses 52 for the associated logic 1 and logic 0 states during the entire bit time interval T and the actual state of the received data bit is decided by a comparison of the counts contained in first and second counter means 31 and 32 at the end of bit time interval T, rather than the absolute number of counts contained therein, which would be equal if the clock pulse-polarity-switching process did not take place in multiplexing means 42 at the middle of the bit time interval. A data decision may therefore be made by comparing the relative values of counts stored in two counting means 31 and 32. This comparison is accomplished by comparison means 38 and the results of the decision will either be that the number of counts A in first counting means 31 is greater than the number of counts B in the second counting means 32 or vice versa, causing one or the other of outputs 38a or 38b to be at a high logic level and therefore steering the Q output of flip-flop 34 to a logic 1 or logic 0 level when the clock C input thereof receives a positive-going transition. This transition, as well as the resetting of the pair of counter means, is responsive to the $\overline{Q}$ pulse output of multivibrator 36, which occurs at the positive-going transition 56 at the end of the inverted bit clock waveform (FIG. 3c).

Simultaneously with the appearance of a non-ambiguous data output binary data level, a logic 1 data valid level will appear at output 20b, if enough beat-note-cycle pulses 52 have been counted by either of counter means 31 or 32 to indicate that a valid data signal has been received. The data valid signal is generated by a logical OR'ing of the fifth and sixth stages of both counters. For practical purposes, the OR function is provided by the inverters 48 and NAND gate 50, allowing use of low-cost standard TTL logic, if a discrete implementation of the complete improved modulator is built. It should be understood that a monolithic integrated circuit implementation of the improved demodulator may provide the logic OR function in any of the other well-known forms for logically OR'ing of separate inputs to derive a single data valid output.

The number of stages in each of counter means 31 and 32, and the stages from which the outputs are required for the logical OR function are determined by the chirp signal frequency span and bit time interval T. It will be seen that the difference in average frequency between the received chirp signal frequency $f_s$ and the local oscillator, or reference, frequency $f_a$ is a triangular function of time, such that the frequency difference $f_d$ is equal to half of the absolute value of the difference between the signal frequency and the average frequency, i.e. $F_d = |f_s - f_a|/2$. Therefore, the number N of counts by which either of counting means 31 or 32 could be incremented in a single bit time interval, assuming no interference or loss of counts for other errors, is given by: $N = F_D T$. For the illustrated case where $f_2 = 200$ KHz. $f_a = 150$ KHz. (and therefore $F_d = 25$ KHz.) and bit time interval $T = 1$ millisecond, the maximum number of counts $N = 25$. Therefore, the minimum counter size is P stages, where $2^P$ is greater than N (or P = 5 stages). One extra stage (N = 6) has been added to allow for the interference effects of CW signals within the chirp frequency band (from lower frequency $f_1$ to upper frequency $f_2$). Because the first and second stages of the second 4-bit counters in each counting means are connected to the data valid logic-OR gates, it requires at least $2^q$, where q is the least significant stage of each counter connected to one of inverters 48 (and is herein such that q = 5) clock pulses to implement the count in the associated counting means for a data bit to be declared valid. Thus, at least 16 (equal $2^{q-1} = 2^4$) of the expected N (=25) beat-note-cycles must be received during a bit time interval. Therefore, the data valid signal (FIG. 3d) attains a logic 1 level 58 in the latter portion of a bit time interval, and no earlier than 0.64 T (i.e. 16T/25) or as late as the last beat-note-cycle 52 in that time interval. In cases where in-band CW interference is present, several of the beat-note-cycle pulses 52 may be missing due to interference and the logic 1 data valid signal 58' does not appear until almost the end of the bit time interval T. In cases of extreme interference, a data valid signal may not be provided, as would be expected. The system can request a retransmission of data in this event. It will also be seen that the complete improved demodulator circuit is fully "programmable" having an average frequency and bit time interval set by external squarewave oscillators, which can themselves be locked to system-wide signals, such as the zero crossings of an A.C. power line waveform, in the illustrated PLC data transmission example.

Figure 4:
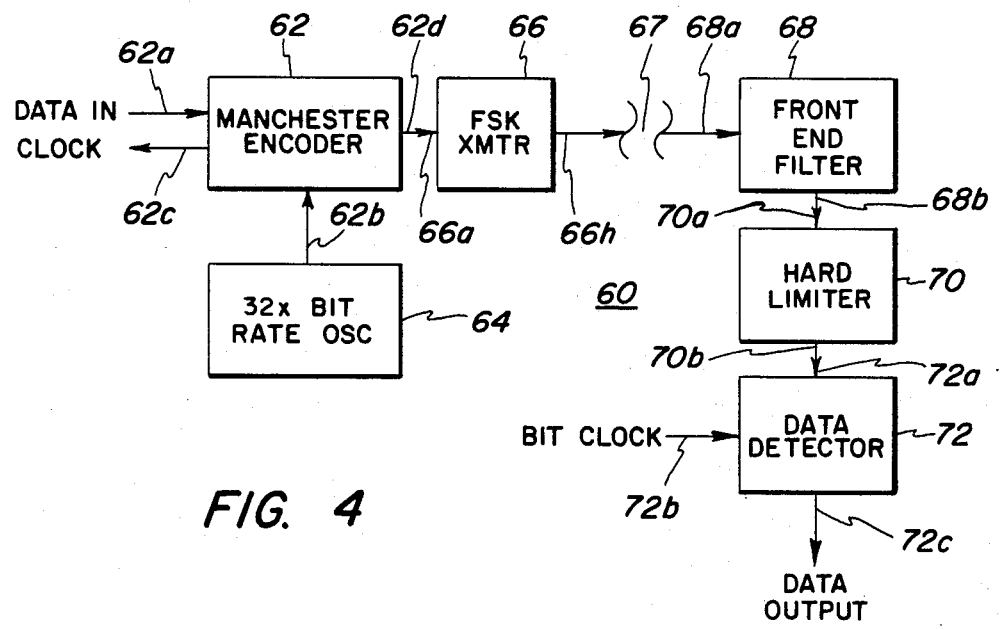
FIG. 4 is a block diagram of a Manchester-encoded FSK transmission-reception system.
Figure 4A:
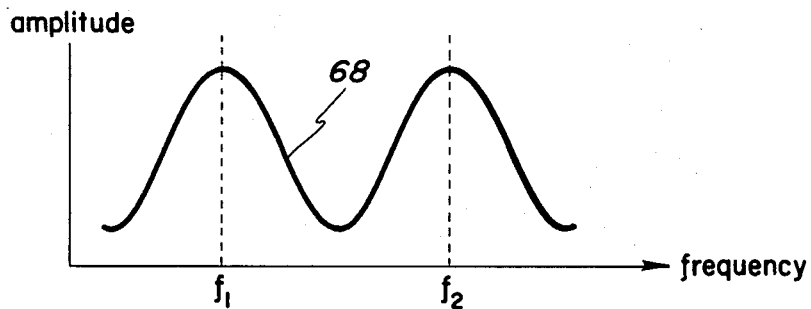
FIG. 4a is a frequency vs. amplitude graph illustrating the filtering characteristics of a front end filter shown in FIG. 4b for the Manchester-encoded FSK demodulator means.

In accordance with another aspect of the present invention, my improved digital data demodulator can be utilized to advantage in a Manchester-encoded FSK digital data transmission system 60 as illustrated in FIG. 4. In such a system, a Manchester encoder means 62, itself known to the art, receives input data at a data input 62a for transmission, and receives a bit rate clock at a second input 62b. The bit rate clock is provided by a bit rate oscillator means 64; if encoder means 62 is a Harris HD-6409 integrated circuit, oscillator means 64 operates at an oscilliatory frequency 32 times greater than the bit rate frequency of the input data appearing at input 62a. The encoder means 62 also provides a data clock output at a first output 62c, to circuitry (not shown) storing the data to be tranmsitted and providing that data in bit-by-bit manner to encoder input 62a responsive to the clock signal at output 62c. The Manchester-encoded digital information is provided at an encoder means output 62d, to the data input 66a of an FSK transmitter means 66. The data- modulated FSK carrier waveform appears at the transmitter output 66b, for coupling through a system medium 67 to the input 68a of a front-end filter means 68 at a receiving location. Since the FSK-modulated waveform operates by switching between first and second frequencies f1 and f2 (FIG. 4a), front end filter means 68 provides an amplitude-frequency response of the double-hump, or over-coupled, type wherein the amplitude at each of the two possible frequencies $f_1$ and $f_2$ is maximized and the amplitude response at all other frequencies is attenuated to as great a degree as practical. The filtered received signal, is provided at a front end filter means output 68b to the input 70a of a hard limiter means 70, providing a substantially constant amplitude characteristic, with frequency, at the output 70b thereof. The frequency-filtered, amplitude-limited signal is applied to data detector signal 72a and a abit clock square waveform of the proper bit frequency is applied to a bit clock input 72b of the data detector, to cause data detector 72 to provide a valid data signal at a data output 72c.

Figure 4B:
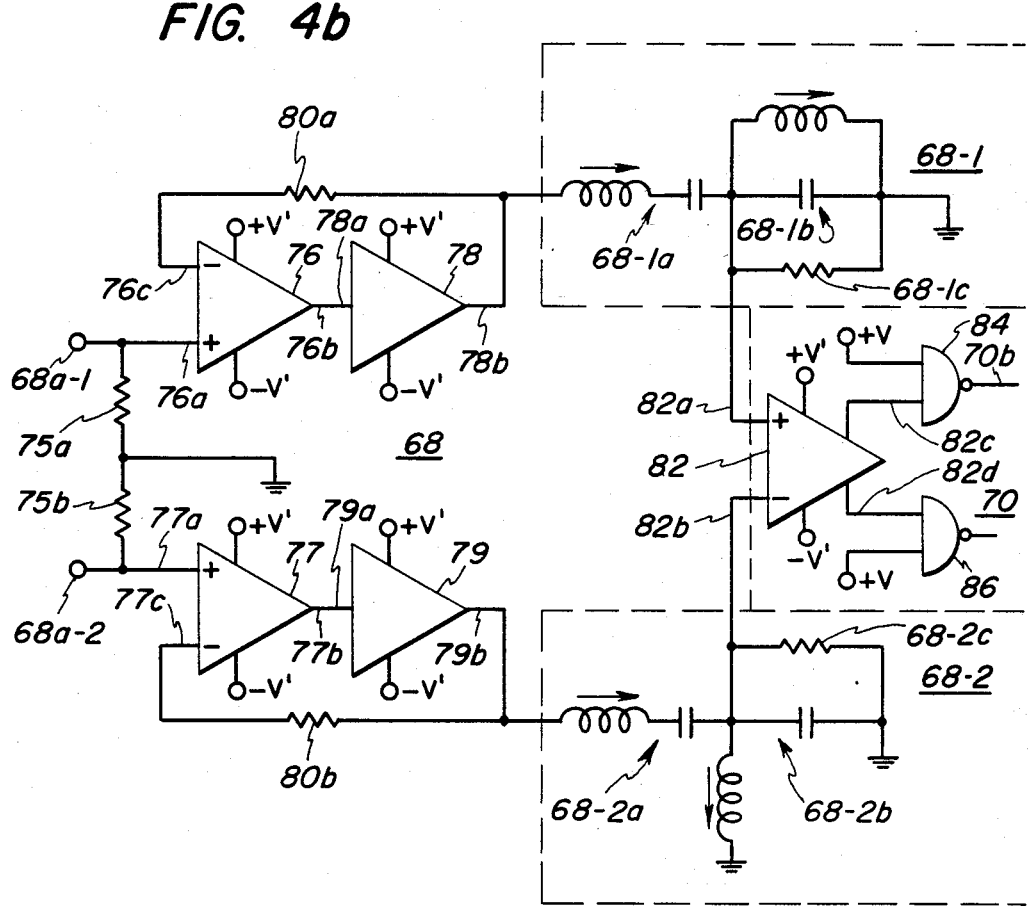
FIG. 4c is a schematic diagram of the embodiment of my improved data detector for use with the front end filter of FIG. 4b, in the system of FIG. 4.

In order to obtain the desired front end filter means 68 frequency response curve 68' (FIG. 4a), the front end filter-hard limiter subcircuit of FIG. 4b may be utilized. This front end filter means includes first and second inputs 68a-1 and 68a-2, which may be fed with the required phase relationship, including a zero phase difference relationship wherein both inputs are connected together to form a common single input 68a. Each of inputs 68a-1 and 68-2 is connected across a terminating resistance 75a or 75b, to circuit common potential, and to the non-inverting +input 76a or 77a of first and second differential amplifiers 76 and 77 respectively. The respective differential amplifier output 76b or 77b is connected to the input 78a and or 79a, respectively, of respective second amplifier stages 78 or 79. The second amplifier stage output 78b or 79b is connected through a feedback resistance 80a or 80b to the respective inverting-input 76c or 77c of the associated first or second respective differential amplifiers. Output 78b or 79b is each connected to the input of one of associated first and second filtering means 68-1 and 68-2, each typically having a series resonant circuit 68-1a and 68-2a, a parallel resonant circuit 68-1b ; and 68-1b and a terminating resistor 68-1c or 68-2c, where the series-resonant circuit and parallel resonant circuit 68-1a and 68-1b are tuned to the first FSK frequency $f_1$ and the series-resonant and parallel-resonant circuits 68-1a and 68-2b are tuned to the remaining FSK frequency $f_2$. The output of each respective one of filtering means 68-1 and 68-2 are connected to a different one of the inputs 82a or 82b of a third differential amplifier means 82, having differential outputs 82c and 82d. Each of the differential outputs 82c and 82d is connected to one input of a different one of a pair of 2-input NAND gates 84 and 86, each having the remaining input thereof tied to a high (logic 1) level potential. Differential amplifer 82 and gates 84 and 86 comprise hard limiter means 70; limiter means output 70b is taken from the output of gate 84.

Figure 4C:
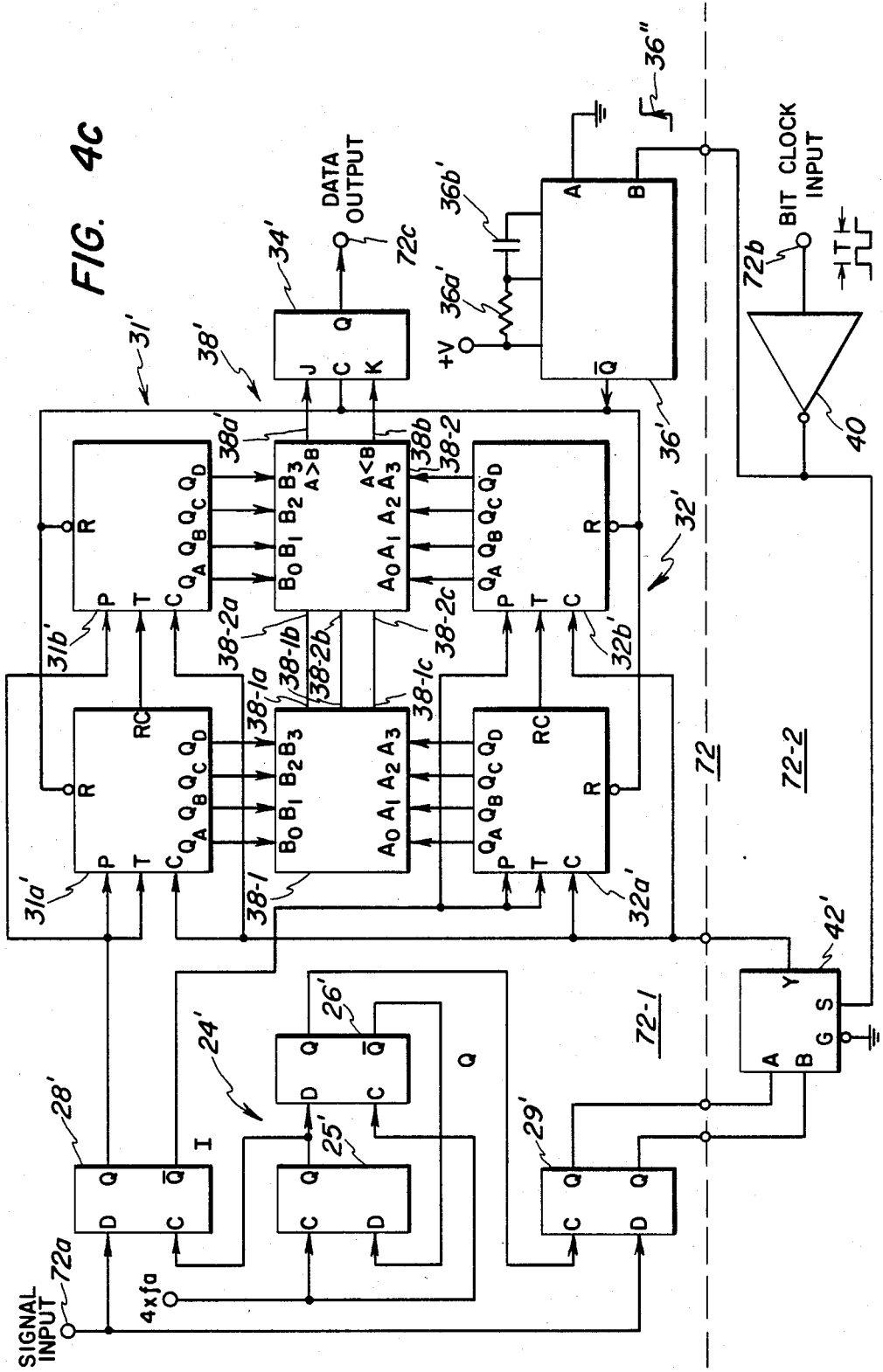

Data detector 72 utilizes the same type of phase-quadrature reference signal generating circuit 24' (utilizing a pair of flip-flops 25' and 26') as utilized in the embodiment of FIG. 2. Similarly, data detector 72 includes first and second mixing means 28' and 29', also similarly connected as in the embodiment of FIG. 2. As switching means 43 was shown in FIG. 2 only by way of illustration and for purposes of explanation of differences in operation, the preferred Manchester-encoded FSK demodulator of FIG. 4c includes multiplexing means 42', having its first selectable input A permanently connected to the Q output of second signal mixing means 29' and having its output Y permanently connected to the clock C inputs of counter means 31' and 32'. The second selectable input B of the multiplexer is connected to the complementary Q output of second mixing means 29', while the select S input is connected to the output of the bit clock waveform inverting means 40'.

Manchester-encoded FSK transmission of binary data signals is chosen to reduce sensitivity to in-band CW noise which cannot be totally rejected by front end filter 68. Manchester encoding provides this additional in-band CW noise discrimination ability by virtue of the fact that the desired signal switches between the first and second frequencies at a time half way through the bit time interval T, while the frequency of any in-band CW interference remains constant and can be discriminated against. While circuits have been known which receive Manchester-encoded FSK signals by detecting the transmitted data at twice the actual rate (since Manchester encoding requires that a differnt binary level be present during each different half of each bit time interval), such a Manchester decoder is prohibitively expensive and cannot optimumly utilize the received signal. In order to utilize detector means 72 to greatest advantage, comparator means 38' consists of the same number of S-bit comparators as the number of S-bit counters in each of counting means 31' and 32'. Each of the S counter outputs is connected to the associated one of the S comparator means inputs. Thus, the four stage outputs $Q_a$-$Q_d$ of first counting means first counter 31a' are individually connected in order to the four B inputs $B_0$-$B_3$ of first comparator 38-1, while the four stage outputs $Q_a$-$Q_d$ of the second counting means first counter 32a' are connected to the associated individual one of the first comparator A inputs $A_0$-$A_3$; similarly, the second counter 31b' or 32b' stage outputs $Q_a$-$Q_d$ are respectively and individually connected to the associated one of the second comparator 38-2 respective B inputs $B_0$-$B_3$ and A inputs $A_0$-$A_3$. The "greater than", "equal" and "less than" outputs 38-1a, 38-1b and 38-1c of the first comparator are connected to the associated inputs 38-2a, 38-2b and 38-2c of the second comparator circuit. The second comparator outputs 38a' and 38b' are again connected to the J and K inputs respectively of the output flip-flop 34'.

In operation, since the Manchester-encoded FSK signal switches its logic state midway through each bit time interval, the same problem as obtained with chirped-frequency-encoded transmission occurs, i.e. each of the two counting means 31' and 32' will receive substantially the same number of incremental counts, if no interference is present, during different ones of the first and second halves of each bit time interval, whereby the count in each of the counter means is approximately equal at the end of the bit time interval and a valid decision as to which binary value has been received cannot be made. The multiplexing means 42' is again utilized to reverse the polarity, or "phase", of the counting means clock signals, provided respectively at first mixing means Q output during the first half of the bit time interval and at the complementary $\overline{Q}$ output during the second half of the bit time interval, to facilitate incrementing only one of the counting means 31' or 32' during each bit time interval. Significantly, with a Manchester-encoded FSK signal, such switching maximizes the difference between the received signal freqeuncy $f_s$ (which is either the lower frequency $f_1$ or the high frequency $f_2$ during any half of the bit time interval, and the reference, or LO, frequency $f_a$ (equal to the mean frequency between the upper and lower frequencies $f_1$ and $f_2$) thereby providing a greater count in the respective counter and improving the performance of data detector 72. It will be seen that input frequency filtering cannot generally be used with an up/down frequency-chirped-modulation technique, whereby the additional frequency filtering provided by means 68 increase the resistance of a Manchester-encoded FSK system to CW interference.

Counting means 31' and 32' are arranged, illustratively, as 8-bit counters, whereby the counts stored in first counter 31' is increased by one whenever the positive-going clock transition from the multiplexer Y output occurs while the first mixing means 28' Q output is high. Conversely, the counts stored in second counting means 32' having the same number of stages (illustratively 8) is increased by one whenever a positive-going transition of the clock waveform at multiplexer Y output occurs when the Q output of first mixing means 28' is at the other (low) logic level. Therefore, first and second counting means 31' and 32' count the number of cycles of the frequency difference between the input Manchester-encoded FSK signal and the local oscillator frequency $f_a$ signal, when the signal frequency is greater than the LO frequency during the first half of that bit time interval and is less than the local oscillator frequency $f_a$ during the second half of that bit time interval. Second counting means 32' performs the same function when the input frequency $f_s$ is less than the local oscillator frequency $f_a$ during the first half of said bit time interval and is greater than the local oscillator frequency $f_a$ during the second half of that bit time interval. The results of the two measurements, which are the number of cycles when the input frequency is first above and then below the local oscillator frequency (and stored in first counting means 31') and the number of cycles counted when the input frequency is first below and then above the LO frequency (and stored in second counting means 32') are compared by the comparator means 38'. The comparative decision, i.e. that more cycles occurred above and then below the local oscillator frequency than occurred below and then above the local oscillator frequency, raises comparator output 38a' and provides a logic 1 level at data output 72c. The opposite decision, that a greater number of cycles occurred first below and then above the local oscillator frequency than occurred first above and then below the local oscillator frequency, raises comparator output 38b' and provides a logic 0 data output at data detector terminal 72c. This decision is provided only at the end of the bit time interval, when the positive-going transmission of the inverted clock waveform triggers multivibrators 36 and clocks the decision into output flip-flop 34'.

The number of stages in each of first and second counting means 31' and 32', and therefore the number of stages in comparator means 38', is determined by the bit time interval and the specific FSK frequencies utilized. For exemplary frequencies of $f_1 = 110$ KHz. and $f_2 = 190$ KHz. in a bit time interval T of 1 millisecond, the local oscillator and signal frequencies have a difference of 40 KHz., which corresponds to a maximum count of 40 for the indicated 1 milliseconds bit time interval. This is approximately a 60 per cent greater count, with respect to the maximum count available with up/down-chirp-frequency coding form of binary data transmission associated with the detector of FIG. 2; the increased count for the Manchester-encoded FSK modulation method will therefore provide a greater reliability of detection, in that a detector means 72, although at the cost of an additional comparator chip in the detector and a possibly more expensive encoder at the transmitter end. It will again be seen that the local oscillator, or average, frequency $f_a$ (being the mean frequency between the upper and lower shifted frequencies $f_1$ and $f_2$) is fully adjustable responsive to an external signal, and the bit time interval is fully responsive to an externally-provided bit clock square waveform. As with the frequency-chirped-modulation detector, these externally-provided square waveforms can be locked to a system-wide signal, or otherwise stabilized and/or adjusted for optimum performance of the improved binary data value detector of this invention.

While several presently preferred embodiments of my novel improved binary data value detector have been illustrated and described in some detail, many modifications and variations will now become apparent to those skilled in the art. It is my intent, therefore, to be limited only by the scope of the appending claims and not by the specific details and instrumentalities presented by way of explanation of the presently preferred embodiments herein.

What I claim is:

1. In a demodulator for recovering binary data bits from a received signal varying between first and second frequencies, said demodulator comprising: means for generating first and second reference frequency signals in phase-quadrature; first and second mixing means each receiving a different one of the phase-quadrature local reference signals for each converting the received signal to respective complementary first and second output signals; first and second counting means each respectively for counting a respective number of transitions in a predetermined direction of the respective first and second output signals of said first mixing means, responsive to a clock signal recovered from one of said second mixing means output signals; and output means for providing a recovered binary data signal responsive to the contents of said first and second counting means during each of a plurality of data bit time intervals, the improvement comprising:

means for substantially reversing the phase of the clock signal applied to both said counting means at a predetermined time during each data bit time interval; and said output means determines the binary value of the demodulator recovered data output signal by a comparison, at the completion of each binary data bit time interval, of the count in said first counting means with the count in said second counting means.

2. The improved demodulator of claim 1, wherein said clock signal reversing means comprises: means receiving the first and second complementary output signals from said second mixing means for selecting only one of said second mixing means first and second complementary output signals as said clock signal responsive to the binary state of a selection timing signal; and means for providing first and second complementary states of said selection timing signal respectively before and after a predetermined time after the start of each data bit time interval.

3. The improved demodulator of claim 2, wherein said selecting means comprises: a multiplexer having a control input receiving said selection signal, first and second selectable inputs each receiving an associated one of the second mixing means complementary first and second output signals, and an output at which one of the signals at said first and second selectable input terminals appears responsive to the present binary state of said selection timing signal at said control input.

4. The improved demodulator of claim 3, wherein said data bit timing interval is controlled by a signal having a period equal to said bit time interval, and said selection timing signal providing means comprises means for inverting the data bit timing interval signal, to provide said selection timing signal to said multiplexer control input.

5. The improved demodulator of claim 4, wherein said multiplexer input control signal is a squarewave signal having a period equal to said data bit timing interval.

6. The improved demodulator of claim 2, wherein said selecting means comprises: means for providing a first one of the second mixing means complementary output signals as said clock signal during substantially the first half of said data bit timing interval and for providing the complementary remaining one of the second mixing means complementary output signal as said clock signal during the remaining portion of the data bit timing interval.

7. The improved demodulator of claim 6, wherein said binary data is transmitted as a chirped-frequency-modulated signal, said first and second counting means having substantially equal numbers of stages; and said output signal determining means comprises comparing means having first and second sets of comparison inputs, each set connected to a like number and sequence of stage outputs of said first and second counting means for determining the recovered data signal state corresponding to that counting means having a greater count therein substantially at the end of each data bit timing interval.

8. The improved demodulator of claim 7, wherein said chirped-frequency modulation occurs between a predetermined lowest frequency and a predetermined highest frequency, said reference frequency being the average between said highest and lowest frequencies.

9. The improved demodulator of claim 8, wherein each of said first and second counting means comprises a sufficient number of stages for counting a number N of counts, where the count number N is the product of the data bit time interval and a difference frequency substantially equal to one-half the absolute value of the difference between said reference frequency and a selected one of said highest and lowest frequencies.

10. The improved demodulator of claim 9, wherein each of said first and second counting means is a multiple-stage binary counter, each counter having a minimum of P stages, wherein P is an integer selected such that $2^P$ is greater than the number N of counts required.

11. The improved demodulator of claim 10, wherein the minimum number of binary counter stages is at least one greater than the number P of counter stages to alleviate effects of interference of said chirped-frequency-modulated signal during any particular bit timing interval.

12. The improved demodulator of claim 7, further comprising: valid-data means connected to said first and second counting means for providing a separate signal only if the bit of data then being presented at said recovered data output is a valid data bit.

13. The improved demodulator of claim 12, wherein said valid-data means comprises: means receiving at least one selected output stage signal from each of said first and second counting means for performing a logical-OR function thereon to generate the separate valid-data signal.

14. The improved demodulator of claim 6, wherein said binary data is transmitted as a Manchester-encoded frequency-shift-keyed (FSK) signal utilizing first and second frequencies; each of said first and second counting means having substantially an equal number of stages selected to count to a predetermined maximum count; and said output signal determining means comprises comparing means having first and second sets of comparison inputs each connected to a like sequence of the outputs of all stages of said first and second counting means for determining the recovered data signal state corresponding to that counting means having a greater count therein substantially at the end of each bit timing interval.

15. The improved demodulator of claim 14, wherein said FSK signal occurs between predetermined first and second frequencies, said reference frequency being the average frequency therebetween.

16. The improved demodulator of claim 15, wherein each of said first and second counting means comprises a sufficient number of stages for counting a number N of counts, where the count number N is the product of the data bit time interval and the difference between said reference frequency and either of first and second frequencies.

17. The improved demodulator of claim 16, wherein each of said first and second counting means is a multiple-stage binary counter, each counter having a minimum of P stages, where P is an integer selected such that $2^P$ is greater than the number N of counts required.

18. The improved demodulator of claim 17, wherein the minimum number of binary counter stages is at least one greater than the number P of counter stages to alleviate effects of interference to said Manchester-encoded FSK signal during any particular bit timing interval.

* * * * *